United States Patent Office
3,740,350
Patented June 19, 1973

3,740,350

NONCRYSTALLINE SOLID COMPOSITIONS EXHIBITING NEGATIVE INCREMENTAL RESISTANCE

Daniel J. Shanefield, 119 Jefferson Road, Princeton, N.J. 08540

No Drawing. Filed Aug. 6, 1971, Ser. No. 169,871
Int. Cl. H01b *1/02, 1/04;* H01c *7/10*
U.S. Cl. 252—512 3 Claims

ABSTRACT OF THE DISCLOSURE

Noncrystalline solid compositions of boron plus aluminum or of boron plus antimony or of silicon plus antimony. A simple bulk solid state diode exhibiting nonmemory switching behavior can be made comprising either said composition. As an applied voltage on the diode is increased, the voltage-current characteristic of the diode exhibits negative incremental resistance. The diode is stable only in its high resistance state, and the diode reverts to this state when the applied voltage is removed. The use of either said composition under severe operating conditions such as high current interrupted DC operation results in improved freedom from undesirable memory effects.

Related patents

The devices described herein are generally related to the materials and devices described in U.S. Pat. Nos. 3,312,923, 3,448,425, and 3,453,583.

Background of the invention

This invention relates to the field of bulk solid state devices and more particularly to such devices having voltage-current characteristics exhibiting current controlled negative incremental resistance.

Electrical devices which are composed of bulk semiconductor with no pn junctions are now well known in the art. More specifically, bulk semiconductor devices exhibiting current controlled negative resistance are also well known and are described in U.S. Pat. 3,448,425 and in other patents.

In one type of negative incremental resistance device having two electrodes, the resistance of this device is high (approximately $10^6$ ohms) when the applied voltage is low (approximately 1 volt). When the applied voltage (through an ohmic external ballast resistor of 1000 ohms) is raised to approximately 100 volts, the resistance of said diode device quickly drops to approximately 10 ohms. When the applied voltage is then lowered to 1 volt again, the resistance of said diode device quickly rises again to approximately $10^6$ ohms. If no specially shaped electric pulses are required to thus raise the resistance again when the voltage is dropped, the said diode device is called "monostable" as defined in U.S. Pat. 3,448,425. This same monostable behavior is sometimes called "nonmemory switching" in other literature such as the article written by me and entitled "Instabilities in Telluride Switching Diodes," published on pages 210–216 of the Journal of Non-Crystalline Solids, volume 2, of the year 1970.

The types of solid active materials useful for making nonmemory switching diode devices can be divided into two categories: (1) crystalline, and (2) noncrystalline compositions. The noncrystalline type has advantages in that this type of active material can be inexpensive, and also it can be resistant to the effects of nuclear radiation. The instant invention is limited only to devices having noncrystalline active materials and to those noncrystalline active materials themselves, and such noncrystalline solid materials might sometimes be called "amorphous" and "glassy," although these terms are more difficult to define than is "noncrystalline." The term "noncrystalline" can easily be defined as "a state of matter which produces substantially no distinct point or line diffraction pattern during exposure to X-rays when examined by conventional X-ray powder diffraction techniques."

The instant invention is an electrical device comprising a solid layer of noncrystalline active material in contact with and between two or more metal or otherwise conductive electrodes, the whole diode part of the electrical device exhibiting negative incremental resistance of the monostable and nonmemory type.

A desirable characteristic of a nonmemory device is, of course, the absence of memory effects. These memory effects might cause the electrical device to fail to return to the higher resistance. (Examples of such memory effects for particular applications where they happen to be desirable are described in U.S. Pat. Nos. 3,448,302 and 3,498,930.)

In the solid state noncrystalline nonmemory negative incremental resistance devices known previous to the instant invention, there are several causes of the memory type failure under severe operating conditions. These failure causes have been described in my article on instabilities mentioned above. Under severe operating conditions such as high current operation (typically 100 milliamperes or more), especially with interrupted direct current, the chain of failure causes can be briefly described as follows. Because of the electrical resistance of the device, the high current heats the active material. If the internal temperature thus obtained is high, the noncrystalline active material can become soft or actually liquid. (Noncrystalline solids often have no discrete melting points, but softening ranges of temperatures can exist instead of melting points.) When the applied current is turned off, the device cools, and the action of alternate melting (or softening) and solidification during repeated operation tends to separate some of the chemical components which make up the noncrystalline mixture in the active material. These separated components themselves are not of optimum composition, and they tend to crystallize more readily than does the unseparated, optimized composition. The crystalline form of the material usually has a lower electrical resistance than the original noncrystalline form, and the separated composition can thus exhibit too low a resistance when subjected to a low voltage in the next operation, and the separated composition can thus fail because of the memory effect.

In order to prevent the separating action of alternate melting and solidification two improvements can be made. First, the high temperature caused by the electric current can be lowered. Second, an active material can be chosen such that its melting (or softening) temperature is much higher than the temperature inside the operating device, even under severe operating conditions.

One solid material which has a very high melting temperature is amorphous boron (ca. 2300° C.). However, when this was used as the active material in a switching diode, the electrical resistance was always so high, even at high applied voltage, that the internal temperature (during high current operation) was high enough to cause memory type failure of the device, and this was described by C. Feldman and W. Gutierrez in their article published on pages 2474–2476 of the Journal of Applied Physics, volume 39, of the year 1968.

One embodiment of my invention comprises the addition of antimony to boron in order to make a noncrystalline solid active material for nonmemory switching diodes, such that when a sufficiently high voltage is applied to the said diode, the electrical resistance of the diode falls to a sufficiently low value that the internal temperature is below the melting point (or softening range) of the active material. Therefore the component chemicals in the active material cannot readily diffuse to separate and cause failure.

A large number of different metals can be added to boron in order to lower the electrical resistance. However, most such metals also drastically lower the melting point as in the case of tellurium additions, or else they tend to sublime during operation as in the case of arsenic additions, or else they tend to promote crystallinity at an unusually low temperature as in the case of gold additions. Many such tendencies to promote crystallinity are not predictable. I have found, to my surprise, that aluminum or antimony can be added to noncrystalline boron, and they do not tend to promote crystallinity during alternate cooling and electrical heating, even during the passage of interrupted DC current. When used in the proper proportions, their additive compositions made with boron have satisfactorily high melting temperatures. The effects of aluminum or antimony on the electrical resistance of noncrystalline boron, which are also difficult to predict, are such that the electrical resistances of these compositions are surprisingly high when the applied voltage is initially low, but the electrical resistances of these compositions are surprisingly low when the applied voltage is raised sufficiently to cause the useful electrical switching action.

In similar fashion, noncrystalline silicon plus antimony can be used to make a switch which is a surprising improvement over the switches of the previous art.

A possible explanation for part of the action of these improved switches is as follows. Discontinuities in the structure of a material such as noncrystalline solid boron act as traps for electrons or holes, and this is responsible for the high electrical resistance of the material at low applied voltage. The average mobility of the electrons or holes at low voltage is extremely low, and some previous workers in the art have written that impact ionization in these materials is therefore not likely. However, my research has indicated that high-mobility states probably do exist in these materials, but they are not densely populated with carriers at low applied voltage. Their effect is difficult to measure at low voltage because there are so many more of the other (low mobility) carriers present. (This is similar to the case of neon gas at low voltage, where free electrons would have high mobility if they were present, but there are practically none present compared to the many immobile orbital electrons which are present.) In my noncrystalline solid compositions, an almost immeasurably small number of carriers does exist initially in the high-mobility states, being in the tail end of the Fermi distribution curve, and the application of a high applied voltage accelerates these few carriers. If a relatively metallic element such as antimony is present as an impurity, it can provide immobile but easily-freed potential carriers having relatively low ionization energies. The few accelerated electrons or holes of the boron strike the potential carriers of the antimony, giving rise to a large population of newly-freed carriers in the high-mobility states of the solid due to impact ionization. The increase in carrier concentration causes the electrical resistance to decrease. (According to my theory, this is similar to the well known cases of impact ionization in neon gas or in single crystal silicon.)

The following experimental facts tend to distinguish my theoretical explanation (trap-emptied conduction) for switching in my novel compositions from the explanations suggested by other inventors (trap-filled conduction) for the switching observed in prior art compositions such as chalcogenide alloys. At low applied voltage, using this general type of material, a small group of carriers which has been generated by such means as photoelectricity will be trapped relatively slowly, and the conductivity continues for at least a few microseconds after the light source is removed. This has led some workers in the art to consider these materials generally as inherently slow-acting with regard to turn-off time. However I have found that at sufficiently *high* applied voltage to cause turn-on, the turn-off time in my novel compositions (after the end of the applied voltage pulse) is *faster* than the comparable turn-off time at *low* applied voltage (after the end of an applied voltage pulse which is too low to have caused turn-on). A possible explanation is that at high voltage there are many more traps which have been emptied by impact ionization and which are therefore able to retrap carriers. At any rate, I have found that my novel diodes can turn off in less than one microsecond, provided there is only low current flowing and a short pulse and therefore only minimal heating. My novel diodes can be used to make relaxation oscillators operating at higher frequencies than one megahertz.

It should be understood that impact ionization as an explanation of the above is not yet fully proven. This explanation is not necessary for the use and practice of the instant invention. This explanation is presented here as a possible aid to understanding the general idea of the instant invention and particularly the need for aluminum or antimony in my compositions. This explanation should aid the user in tailoring specific compositions within the ranges of my claims.

The above more detailed explanation for the need for aluminum or antimony in my novel boron or silicon compositions can be summarized by the brief statement that my novel improved compositions are able to provide operating switching temperatures as low as some of the compositions of the prior art, in spite of the fact that my novel improved compositions are high-melting or high-softening materials which ordinarily without the novel aluminum or antimony additions would have very high switching and operating temperatures. It is interesting and coincidental that many of the electrical characteristics of my novel improved compositions overlap with characteristics of some prior art compositions, but my novel compositions are useful for making switching devices with improved reliability under severe operating conditions.

The above explanations and theories, without the experiments that I have done in an exploratory manner, are not sufficient to predict which elements can specifically be combined to provide the improvements claimed in the instant invention, as distinguished from those elements and combinations which are less useful in this type of composition and device. Besides boron and silicon, other noncrystalline materials having high melting or softening temperatures and high resistances can be modified to give lower resistances by the addition of metals, but the many other combinations tried in my experiments have consistently yielded switching devices which failed during operation under severe conditions such as high current interrupted DC switching, and I have not been able to explain the reasons and theories for the failures of many of these compositions outside the range of the claims of the instant invention.

Accordingly, an object of this invention is to provide noncrystalline solid compositions for use in current-controlled negative incremental resistance switching devices such as electrical diode devices or other devices, all said devices exhibiting improved stability against the tendency toward memory effects under severe conditions such as high current interrupted DC operation. Other objects of the invention will become apparent by reference to the following detailed description and appended claims. Still other objects of this invention will in part be obvious.

Summary

The invention herein is based upon the provision of novel noncrystalline compositions, and devices fabricated therewith, of either boron plus aluminum or of boron plus antimony or of silicon plus antimony, such noncrystalline solid compositions exhibiting improved stability against the tendency of prior art noncrystalline switching compositions toward detrimental memory effects.

Detailed description

The novel ranges of compositions which, according to my discovery, provide unexpectedly advantageous results over prior art compositions when employed in the noncrystalline solid state as the active material of non-memory switching elements and electrical devices, the compositions of this invention, are the following:

a composition, by weight, within the range of boron, 36% to 87%, plus aluminum, 64% to 13%;
another range of composition, by weight, within boron, 6% to 58%, plus antimony, 94% to 42%;
still another range of composition, by weight, within silicon, 29% to 75%, plus antimony, 71% to 25%.

The starting materials for the preparation of these noncrystalline compositions consist of the chemical elements in essentially pure, polycrystalline powdered form. In one method of preparation a pair of powders such as boron and aluminum, selected approximately from the above ranges, is mechanically mixed and then quickly hot pressed at 300° C. and 100 p.s.i. in an argon gas atmosphere to form a disk of polycrystalline material. This disk has approximately the same composition as the desired noncrystalline product but not exactly the same composition. This disk is then used as the cathode in a conventional diode sputtering apparatus such as the apparatus described in an article by W. N. Huss published on pages 50–55 of Solid State Technology magazine, volume 9, of the year 1966. The preferred sputtering conditions include the following: atmosphere inside the vacuum chamber is essentially pure argon gas at 0.03 torr pressure; cathode to substrate distance is 2 cm.; cathode to anode electrical potential is 2000 volts; cathode to anode current is 0.5 amp; substrate onto which the composition of the instant invention is deposited by sputtering is a graphite plate which is not heated but which is maintained at approximately 0° C. or lower by a hollow aluminum metal heat sink through which cooled brine is circulated; deposition is continued until the composition of the instant invention has deposited to a thickness of approximately one micrometer.

It should be understood that methods other than the above can be used to prepare these novel compositions, and that the said above preparation method is for example only and does not limit the scope of the invention. Another method which is useful for preparing the noncrystalline active material composition of the instant invention is electron beam heated evaporation in a high vacuum chamber as described in the article by C. Feldman and W. Gutierrez cited above, except that for my novel compositions the two chemical elements such as boron and aluminum should be heated separately in two crucibles, with two electron beams of different intensities, and with the effluent vapor streams mixing and converging simultaneously onto one substrate. Still another method for preparing these said compositions which will be obvious to those skilled in the art after my present disclosure is chemical vapor deposition in the manner described for the preparation of boron arsenide and reported in a talk given by T. L. Chu and A. E. Hyslop and abstracted on page 250–C of the Journal of the Electrochemical Society, volume 116, of the year 1969.

The diode devices of the instant invention are fabricated by applying a layer of the said noncrystalline active material composition onto a suitable substrate such as a graphite plate or an aluminum metal plate and then by applying spring wire electrodes thereto in the manner described in U.S. Pat. No. 3,312,923 commencing at column 11, line 41 thereof and ending at column 11, line 66 thereof.

It should be understood that while U.S. Pat. No. 3,312,-923 shows specific configurations for making electrical contact to the noncrystalline active material, it is possible to provide electrical contact to the active material in other ways, and said specific configurations are for example only and do not limit the scope of the instant invention.

The diode device of the instant invention, in one of its embodiments, exhibits approximate voltage versus current characteristics and will operate in a typical electrical circuit such as those shown in FIGS. 2 and 3, respectively, of U.S. Pat. No. 3,448,425. Modifications in percentage composition and film thickness will result in changes in the required operating voltages, currents, and times.

In some modifications the chemical kinetic rate of formation of the noncrystalline active material is very high and during the formation process the substrate graphite plate is very cold, and then the resulting bulk resistivity of the active material thus formed is high (ca. $10^7$ ohm cm.), in the range of what can be called an insulator, and the film thickness for one type of diode device should then be small (ca. 0.5 micrometer). In other modifications and embodiments of the instant invention the rate of formation is slower and the substrate warmer, and then the bulk resistivity is lower (ca. $10^3$ ohm cm.), in the range of semiconductors, and the film thickness might then be greater (ca. 50 micrometers).

The non-crystalline diode devices of the instant invention operate the same way regardless of the direction of the applied current and are therefore bilateral and nonrectifying toward alternating current, and they are insensitive to the polarity of the applied voltage and current.

The following examples are directed to preferred specific compositions which were mostly prepared according to the above-prescribed diode sputtering technique. The invention will become more apparent from these following descriptive embodiments of the broad inventive idea.

EXAMPLE 1

A noncrystalline composition which was later shown by chemical analysis to be 81 wt. percent boron and 19 wt. percent aluminum was sputtered onto a graphite plate 1 inch by 1 inch by 0.1 inch in size. The boron-aluminum composition was in the form of a layer 0.93 micrometer thick in the center area. The method of sputtering was as described in the above text. To form the desired switching diode exhibiting negative incremental resistance, the graphite plate substrate was made a "bottom" electrode by attaching it to one wire of an electrical driving circuit. The other wire of said circuit was attached to another electrode, which consisted of a tungsten wire spring which was arranged to make spring contact with the boron plus aluminum composition, and this wire then comprised the "top" electrode. Contact was made approximately at the center of the boron plus aluminum film, with a force of approximately 3 grams.

EXAMPLE 2

Method of Example 1, except that an aluminum metal plate was used instead of the graphite plate.

EXAMPLE 3

Method of Example 1, except that a molybdenum plate was used instead of the graphite plate.

EXAMPLE 4

Method of Example 1, except that an aluminum wire was used instead of the tungsten wire.

EXAMPLE 5

Method of Example 1, except that 36 wt. percent boron plus 64 wt. percent aluminum (as analyzed) was used as the active material composition instead of the said 81% boron plus 19% aluminum composition.

EXAMPLE 6

Method of Example 1, except that the active material was 21% boron plus 79% antimony.

EXAMPLE 7

Method of Example 1, except that the active material was 68% silicon plus 32% antimony.

EXAMPLE 8

Method of Example 1, except that the active material was prepared by electron beam evaporation and the noncrystalline composition obtained on the chilled graphite plate substrate was analyzed to be 87% boron plus 13% aluminum, of thickness 13 micrometers in the center area. While the temperatures of the boron and aluminum source materials were not measured, it was observed by the differences in their emitted light that they were being maintained at very different temperatures, the boron being at white heat and the aluminum being barely red hot. The deposition rate was 13 micrometers per hour.

While the principles of the invention have been described above in connection with specific embodiments and particular modifications thereof, it is to be clearly understood that this description is made only by way of example and not as a limitation on the scope of the invention.

What is claimed is:

1. A noncrystalline solid composition consisting essentially of boron and aluminum having a composition, by weight, within the range of from 36% boron plus 64% aluminum to 87% boron plus 13% aluminum.

2. A noncrystalline solid composition consisting essentially of boron and antimony having a composition, by weight, within the range of from 6% boron plus 94% antimony to 58% boron plus 42% antimony.

3. A noncrystalline solid composition consisting essentially of silicon and antimony having a composition, by weight, within the range of from 29% silicon plus 71% antimony to 75% silicon plus 25% antimony.

References Cited

UNITED STATES PATENTS

| | | | |
|---|---|---|---|
| 3,312,923 | 4/1967 | Eubank | 338—20 |
| 3,348,929 | 10/1967 | Valtschev et al. | 117—227 |
| 3,381,255 | 4/1968 | Youmans | 252—512 |
| 3,448,425 | 6/1969 | Shanefield et al. | 338—20 |
| 3,545,967 | 12/1970 | Mandal | 252—512 |

FOREIGN PATENTS

| | | |
|---|---|---|
| 801,916 | 9/1958 | Great Britain. |
| 846,292 | 8/1960 | Great Britain. |

OTHER REFERENCES

Serebryanskii et al., "Phase Diagram of the Aluminum-Boron System," Chemical Abstracts, vol. 62: 1941d (1962).

Saidov et al., "Silicon Device With a Negative Resistivity," Chemical Abstracts, vol. 68: 90775n (1968).

Pinter et al., "Silicon," Chemical Abstracts, vol. 61: 16186b (1961).

C. Feldman et al., "Switching and Negative Resistance in Amorphous Boron Layers," Journal of Applied Physics, vol. 39, No. 5, pp. 2474–76 (April 1968).

W. Klein, "Semiconductor Properties of Boron in the Electrical Breakdown Range," Journal of Applied Physics, vol. 39, No. 12, pp. 5797 and 98 (November 1968).

CHARLES E. VAN HORN, Primary Examiner

U.S. Cl. X.R.

117—227; 338—20